UNITED STATES PATENT OFFICE 2,657,197

COPOLYMERS OF VINYLIDENE CYANIDE WITH UNSATURATED ALIPHATIC CARBOXYLIC ACIDS

Earl J. Carlson, Akron, Ohio, assignor to The B. F. Goodrich Company, New York, N. Y., a corporation of New York No Drawing. Application June 11, 1952, Serial No. 293,000

11 Claims. (Cl. 260—78.5)

This invention relates to novel copolymers of vinylidene cyanide with olefinically-unsaturated aliphatic carboxylic acids and the preparation thereof, which copolymers are extremely useful resinous materials.

In U. S. Patents 2,476,270 and 2,502,412 to Alan E. Ardis, and 2,514,387 to Harry Gilbert, novel methods for preparing monomeric vinylidene cyanide are disclosed. U. S. Patent 2,589,294 to Richard F. Schmidt et al. discloses the preparation of useful homopolymers of vinylidene cyanide.

Monomeric vinylidene cyanide is a clear liquid at room temperature and a crystalline solid at 0° C. It melts in the range of 6.0° C. to 9.7° C., depending upon purity, with the purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When the monomer is allowed to stand at room temperature in admixture with 1,3-butadiene, it reacts therewith to give solid 4,4-dicyanocyclohexene.

It has now been discovered that monomeric vinylidene cyanide having the above physical and chemical characteristics will copolymerize with olefinically-unsaturated aliphatic carboxylic acids in the presence of a free radical initiator to give new and highly useful copolymers.

The olefinically-unsaturated aliphatic carboxylic acids which are polymerized with vinylidene cyanide in accordance with the present invention are characterized by possessing one or more olefinic carbon-to-carbon double bonds and one or more carboxyl groups, that is, monocarboxylic and polycarboxylic, monoolefinic and polyolefinic aliphatic acids including such materials as acrylic acid, crotonic acid, sorbic acid and maleic acid.

Better results are obtained by utilization of one or more olefinically-unsaturated aliphatic carboxylic acids containing at least one activated olefinic carbon-to-carbon double bond, that is, an acid containing an olefinic double bond which readily functions in an addition polymerization reaction because the olefinic double bond is present in the monomer molecule either in the alpha-beta position with respect to the carboxyl group thusly

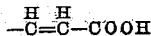

or attached to a terminal methylene group thusly $CH_2=C<$. In the alpha-beta unsaturated carboxylic acids, the close proximity of the strongly polar carboxyl group to the double bonded carbon atoms has a strong activating influence rendering the substances containing this structure very readily polymerizable. Likewise, when an olefinic double bond is present attached to a terminal methylene group, the methylenic hydrogen atoms are very reactive making the double bonded carbon atoms readily enter into polymerization reactions.

Those olefinically-unsaturated aliphatic carboxylic acids which are preferred are those in which the olefinic double bond is present both in the alpha-beta position to a carboxyl group and which is also attached to a terminal methylene group such as acrylic acid, methacrylic acid, ethacrylic and the like. Other useful olefinically-unsaturated aliphatic carboxylic acids include crotonic acid, isocrotonic acid, alpha-methyl crotonic acid and other alpha-alkyl crotonic acids, vinyl acetic acid, allylacetic acid, alpha-vinyl acrylic acid, beta-vinyl acrylic acid, sorbic acid, alpha-methyl sorbic acid and other alkyl sorbic acids, maleic acid, fumaric acid, itaconic acid and the like and mixtures thereof. Those olefinically-unsaturated aliphatic carboxylic acids containing from three to ten carbon atoms are generally preferred.

The copolymerization of vinylidene cyanide with unsaturated carboxylic acids of the above-described class may be carried out in a number of different ways. One preferred method consists of dissolving the vinyidene cyanide and unsaturated carboxylic acid in an aromatic hydrocarbon or chlorinated aromatic hydrocarbon solvent such as benzene, toluene, methyl toluene, trichlorobenzene and the like which is preferably free from impurities which initiate the ionic polymerization of the vinylidene cyanide monomer, and in an amount such that the solvent comprises approximately 30 to 80% by weight of the total solution. A polymerization initiator is included in this solution and the resulting mixture is heated preferably to a temperature of about 20° C. to 80° C., whereupon copolymerization occurs to form the desired copolymer as a white resinous powder of small particle size. The copolymer thus formed may be recovered from the polymerization mixture by filtering or evaporation of the other constituents.

Alternatively, the polymerization may be carried out without the use of a solvent or other liquid medium for the monomers simply by heating and agitating a mixture of the monomers with a polymerization initiator such as a peroxygen compound to effect the copolymerization. The copolymerization occurs most readily at temperatures from about 20° C. to 100° C., the copolymer generally forming as a white resinous powder which is easily separated from the other constituents.

The polymerization may be effected at temperatures as low as 0° C. or lower, or as high as 100° C. or higher, provided that an initiator is utilized which will dissociate into free radicals at the polymerization temperature.

The relative amounts of vinylidene cyanide and unsaturated carboxylic acid in any polymerization charge are not critical since a useful copolymer is obtained regardless of the amount of either comonomer in the charge. The amount of vinylidene cyanide in the monomer charge may be as low as 0.1 mol per cent or as high as 99 mol per cent while still obtaining copolymers markedly different in properties from homopolymers of either vinylidene cyanide or the acid monomer.

Regardless of the polymerization method or monomer ratio utilized, the polymerization is preferably stopped before either of the monomers is entirely consumed in order that a true copolymer will be obtained. It is often desirable to add to the polymerization mixture during the course of the copolymerization reaction, continuously or intermittently, fresh quantities of one or both monomers and also of initiator and solvent if desired, thus taking full advantage of the combining ratio of the monomers and the capacity of the equipment, and in effect operating a continuous or semi-continuous process.

The initiator which is employed in the polymerization process is preferably a peroxygen compound, such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, 2,4-dichlorobenzoyl peroxide, o,o'-dibromobenzoyl peroxide, caprylyl peroxide, pelargonyl peroxide, tertiary butyl hydroperoxide, tetralin peroxide and the like. In general, from 0.01% to 2.0% by weight of the initiator, based on the weight of the monomers is employed, although larger or smaller quantities may be used if desired.

The following examples illustrate the preparation of copolymers of vinylidene cyanide with olefinically-unsaturated aliphatic carboxylic acids, in accordance with this invention, but are not to be construed as a limitation upon the scope thereof, for there are of course, many possible variations and modifications.

*Examples 1 through 8*

A series of 8 copolymers of vinylidene cyanide with acrylic acid are prepared by mixing 10 grams of a monomer mixture, composed of varying amounts of both monomers, with 0.015 gram of o,o'-dichlorobenzoyl peroxide and 20 ml. of benzene in a reaction vessel, blanketing the mixture with nitrogen, sealing the reaction vessel and maintaining the resulting mixture at a temperature of about 50° C. for a period of time from 7 to 32 hours. The solid resinous copolymers obtained at the end of the reaction are dried and analyzed to determine composition. The amounts of reactants, reaction data and analysis of the copolymers are recorded in the following table:

| Example | Monomer Vinylidene Cyanide | Ratio-Grams Acrylic Acid | Mol percent Vinylidene Cyanide | Reaction Time, Hours | Conversion, percent | Nitrogen Content of Polymer, percent | Vinylidene Cyanide in copolymer, mol percent |
|---------|---------|---------|---------|---------|---------|---------|---------|
| 1 | 9.07 | .93 | 90 | 32 | 1.9 | 28.2 | 77.21 |
| 2 | 8.13 | 1.87 | 80 | 32 | ¹0.3 | 25.29 | 68.77 |
| 3 | 7.17 | 2.83 | 70 | 32 | 4.2 | 22.69 | 61.36 |
| 4 | 6.19 | 3.81 | 60 | 32 | 6.5 | 20.55 | 55.28 |
| 5 | 4.19 | 5.81 | 40 | 32 | 3.2 | 17.21 | 45.96 |
| 6 | 3.17 | 6.83 | 30 | 32 | 4.2 | 15.47 | 41.13 |
| 7 | 2.13 | 7.87 | 20 | 7 | 0.9 | 14.12 | 37.44 |
| 8 | 1.07 | 8.93 | 10 | 7 | 0.8 | 10.54 | 27.73 |

¹ Part of sample lost through error.

*Example 9*

Vinylidene cyanide and alpha-methacrylic acid are copolymerized by mixing equal portions by weight of the two monomers with o,o'-dichlorobenzoyl peroxide and benzene in a reaction vessel which is maintained at about 50° C. for a sufficient period of time to obtain copolymerization. A solid resinous copolymer is obtained as a result of the copolymerization reaction.

*Example 10*

Example 9 is repeated employing sorbic acid in place of methacrylic acid. The polymerization is less rapid than in Examples 1 to 9 and a solid resinous copolymer possessing a lower softening point than those of the preceding examples is obtained.

When the preceding examples are repeated in the absence of benzene, that is, by simply mixing the two monomers and the initiator together and heating, excellent resinous copolymers are obtained. When the copolymerization is carried out with the other olefinically-unsaturated aliphatic carboxylic acids present in addition to or in place of the acids used in the examples, either singly or in admixture, excellent copolymers are also obtained. Likewise when the polymerization is carried out utilizing other of the peroxygen initiators of the type disclosed hereinbefore, or in the presence of other aromatic solvents of the type also disclosed hereinbefore, or at temperatures as low as 0° C. or as high as 100° C. or higher, useful resinous materials are obtained containing copolymerized vinylidene cyanide and olefinically-unsaturated aliphatic carboxylic acid which differ markedly in properties from homopolymers of either of the two monomers.

The copolymers prepared according to the method of the present invention are extremely useful resinous materials. For example, they may be utilized in the melt or solvent spinning of excellent filaments and in the preparation of films as well as for many other uses.

Although specific examples of the invention have been herein described, it is not intended to limit the invention solely thereto, but to include all of the variations and modifications falling within the spirit and scope of the appended claims.

I claim:

1. A copolymer of monomers consisting of vinylidene cyanide and olefinically-unsaturated aliphatic carboxylic acid containing at least one activated olefinic carbon-to-carbon double bond, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid water-insoluble resin.

2. The copolymer of claim 1 wherein the olefinically-unsaturated aliphatic carboxylic acid is one in which at least one olefinic double bond is in the alpha-beta position with respect to the carboxyl group.

3. The copolymer of claim 1 wherein the olefinically-unsaturated aliphatic carboxylic acid contains a terminal methylene $CH_2=C<$ grouping.

4. A two component copolymer of vinylidene cyanide with acrylic acid, the vinylidene cyanide units in said copolymer being derived from monomeric vinylidene cyanide which is a crystalline solid at 0° C., having a melting point when in purest form of substantially 9.0° C. to 9.7° C. and being characterized chemically by the ability to undergo on contact with water at room temperature an instantaneous homopolymerization reaction to give a solid water-insoluble resin.

5. The method which comprises mixing together monomeric vinylidene cyanide, which is liquid at room temperature and a crystalline solid at 0° C., having a melting point when in pure form of substantially 9.0° C. to 9.7° C. and is characterized chemically by the ability to undergo, on contact with water at room temperature an instantaneous homopolymerization reaction to give a solid, water-insoluble resin, and an olefinically-unsaturated aliphatic carboxylic acid containing at least one activated olefinic carbon-to-carbon double bond in the presence of a peroxygen initiator, whereupon polymerization occurs to form a two component copolymer of vinylidene cyanide and olefinically-unsaturated aliphatic carboxylic acid.

6. The method of claim 5 wherein the olefinically-unsaturated aliphatic carboxylic acid contains at least one olefinic double bond in the alpha-beta position with respect to the carboxyl group.

7. The method of claim 5 wherein the olefinically-unsaturated aliphatic carboxylic acid contains a terminal methylene $CH_2=C<$ grouping.

8. The method of claim 5 wherein the reaction is conducted at a temperature of from 20 to 100° C.

9. The method of claim 8 wherein the peroxygen initiator is o,o'-dichlorobenzoyl peroxide.

10. The copolymer of claim 1 wherein the olefinically-unsaturated aliphatic carboxylic acid contains 3 to 10 carbon atoms.

11. The method of claim 5 wherein the olefinically-unsaturated aliphatic carboxylic acid contains 3 to 10 carbon atoms.

EARL J. CARLSON.

References Cited in the file of this patent

UNITED STATES PATENTS

| Number | Name | Date |
|---|---|---|
| 2,466,395 | Dickey | Apr. 5, 1949 |
| 2,615,871 | Folt | Oct. 28, 1952 |